United States Patent [19]

Kuhn

[11] 4,060,408

[45] Nov. 29, 1977

[54] MELTING PROCESS

[75] Inventor: John E. Kuhn, Lower Burrell, Pa.

[73] Assignee: Aluminum Company of America, Pittsburgh, Pa.

[21] Appl. No.: 763,829

[22] Filed: Jan. 31, 1977

[51] Int. Cl.² ............................................. C22B 21/00
[52] U.S. Cl. .................................... 75/68 R; 75/44 S; 75/65 R
[58] Field of Search .................. 75/43, 44 R, 44 S, 68, 75/65

[56] References Cited

U.S. PATENT DOCUMENTS

| 2,089,742 | 8/1937 | Garwin | 75/68 R |
|---|---|---|---|
| 2,204,173 | 6/1940 | Bowser | 75/68 R |
| 2,264,740 | 12/1941 | Brown | 75/68 UX |
| 2,465,544 | 3/1949 | Marsh | 75/68 R X |
| 3,276,758 | 10/1966 | Baker et al. | 75/68 R X |
| 3,510,116 | 5/1970 | Harvill et al. | 75/68 R X |
| 3,839,016 | 10/1974 | Rawlings | 75/44 S |
| 3,869,112 | 3/1975 | Habayeb | 75/44 S |

*Primary Examiner*—M. J. Andrews
*Attorney, Agent, or Firm*—William J. O'Rourke, Jr.

[57] ABSTRACT

A process is disclosed for burning hydrocarbons in the vapors emitted from contaminated metallic scrap in a remelt furnace having a molten bath therein. The furnace comprises a charging chamber and a heating chamber separated by a wall. The wall is provided with at least one lower opening and at least one upper opening through which the chambers are in communication above and below the level of molten metal. Scrap is charged into the charging chamber where molten metal ablatively melts the charge. Oil and other surface contaminants evolving from the charge are drawn through the upper opening in the wall into the heating chamber by maintaining a pressure in the heating chamber less than, or negative in relation to, the pressure in the charging chamber. The hydrocarbon vapors burn in the heating chamber and contribute heat of combustion. Controlling the level of pressure differential between the heating chamber and the charging chamber facilitates substantial benefits in efficiency and economy.

12 Claims, 2 Drawing Figures

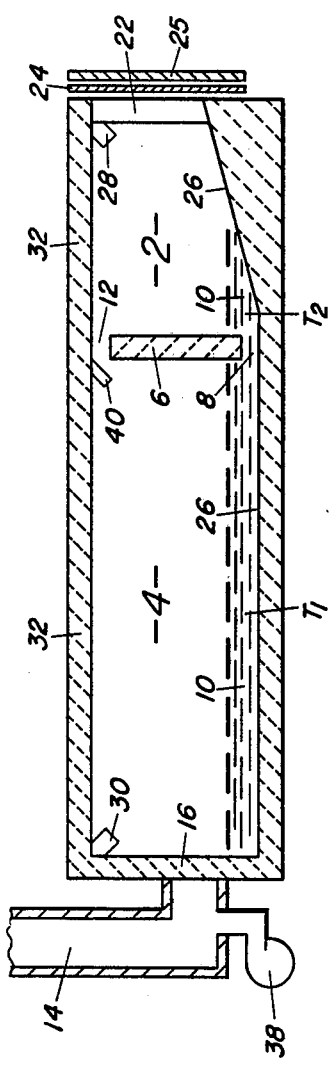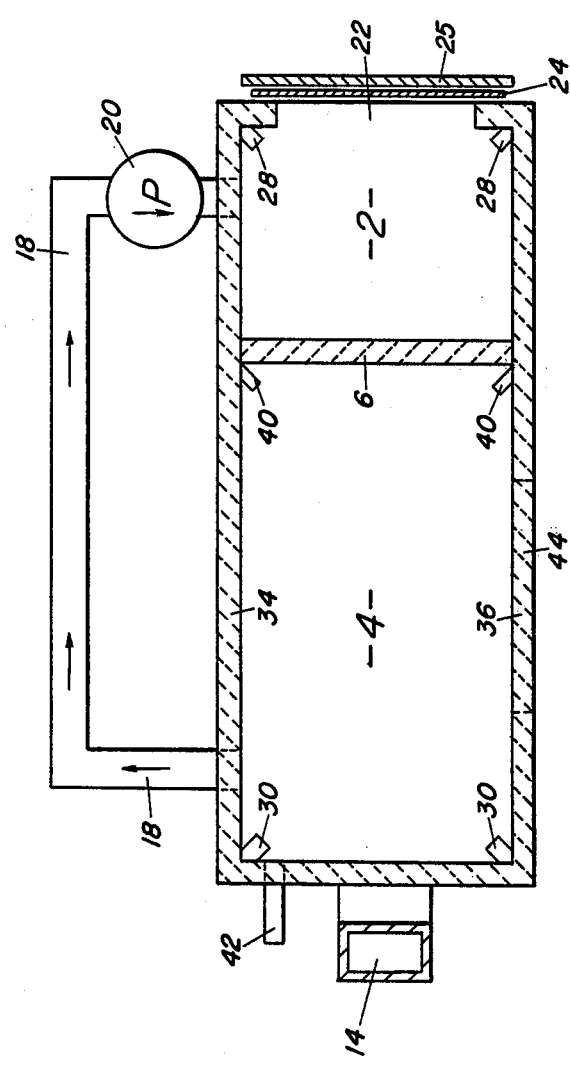

MELTING PROCESS

BACKGROUND OF THE INVENTION

1. Field of Invention

This invention relates to the melting of scrap metal, particularly scrap aluminum, and more particularly to controlling pollutants emitted during the melting of scrap contaminated with oil, grease and other combustible hydrocarbon contaminants.

2. Description of the Prior Art

A common source of aluminum feed stock for remelting operations is scrap obtained from the industry. Such scrap includes turnings and borings from a machine shop, aluminum can scrap, oily aluminum briquettes, and miscellaneous skeletal scrap remaining after a sheet has been punched, blanked or stamped. Often this scrap is collected and compacted into scrap briquettes having a size of, for example, one foot cubed. This scrap is typically contaminated with oil, grease and other lubricants, or lacquers, paint and other metal coating materials decomposable or vaporizable at metal melting temperatures.

A major problem associated with the melting of such scrap involves the elimination or effective removal of hydrocarbon fumes emitted from the scrap in a remelt furnace. It is common practice to melt such scrap by introducing the scrap into a hot molten aluminum bath or stream. Scrap aluminum briquettes are less dense than molten aluminum which causes the briquettes to float on the surface on the molten aluminum. In such a situation, if the furnace temperature is too high, the aluminum scrap exposed to the heat and air will oxidize at an accelerated rate resulting in excessive melt loss, as discussed in Spear et al U.S. Pat. No. 3,770,420.

It has been disclosed in the prior art, such as Habayeb U.S. Pat. No. 3,869,112, to construct a remelt furnace with two sections, a charging well and a melting chamber constructed such that molten metal at the bottom of the furnace may circulate therebetween. The charging well is isolated from the burners which provide hot blast to the melting chamber and therefore the oxidation rate and resultant melt loss are reduced. However, the temperature in the charging well is not high enough to burn the hydrocarbon fumes emitted from the scrap in the charging well. An apparatus, including a collecting hood, a duct, and a blower are provided to convey the emissions from the charging well to the burners in the melting chamber where the hydrocarbons in the emissions are burned.

Heretofore, conventional open hearth and other remelt furnaces were constructed to operate under positive pressure in order to prevent air from entering the furnace. Air has been considered detrimental to the melting operation in two ways. First, the ambient air has a cooling effect on the furnace. Second, the air causes excessive oxidation of the scrap with resulting melt loss. Even with the advent of multi-chamber furnaces the practice of operating both chambers under positive pressure to avoid ingesting air persisted. Maintaining such positive pressure tends to require the use of auxiliary equipment to convey hydrocarbon vapors from a charging chamber to a heating chamber, as taught in Rawlings U.S. Pat. No. 3,839,016 and Habayeb U.S. Pat. No. 3,869,112. This type of complex equipment, including blowers, ductwork and associated instruments and controls, involves not only substantial initial capital expenditures but also significant maintenance and operating expenses which are desirably avoided or at least reduced.

Accordingly, an economical process and apparatus is desired for eliminating or effectively removing hydrocarbon fumes emitted from contaminated scrap in a remelt furnace and utilizing the fuel values therein while avoiding economic and reliability shortcomings of the prior systems.

SUMMARY OF THE INVENTION

This invention may be summarized as providing a process for burning hydrocarbon vapors emitted from contaminated metallic scrap in a remelt furnace having a molten bath therein. The furnace comprises a charging chamber and a heating chamber separated by a wall. The wall is provided with at least one lower opening and at least one upper opening through which the chambers are in communication above and below the level of molten metal which is circulated from the charging chamber to the heating chamber and back to the charging chamber. The process comprises the steps of charging the scrap into molten metal moving through the charging chamber, maintaining a negative pressure in the heating chamber with respect to the charging chamber, whereby vapors from the oil and other surface contaminants evolving from the charged scrap are drawn through the upper opening in the wall into the heating chamber. Combustion of the hydrocarbon vapors occurs in the heating chamber, thus contributing heat thereto and to the molten metal moving therethrough.

An objective of the present invention is to provide a process for reducing pollution while simultaneously reducing the melt loss normally associated with remelting operations.

Among the advantages of the present invention is the provision of a process for transferring the vapors emitted from contaminated metallic scrap from a charging chamber into a heating chamber without the requirement of auxiliary gas transfer or pollution control equipment.

Another advantage of the present invention is the provision of a system which maintains a negative pressure in a heating chamber with respect to an adjacent charging chamber of a dual chamber furnace, sufficient to draw hydrocarbon emissions from the charging chamber into the heating chamber.

Another advantage of the present invention is the utilization of hydrocarbon emissions as an additional source of heat in a heating chamber of a dual chamber remelt furnace.

The above and other objects and advantages of the present invention will be more fully understood and appreciated with reference to the following detailed description and the drawing appended hereto.

BRIEF DESCRIPTION OF THE DRAWING

FIG. 1 is a side elevation view of a dual chamber melting furnace of the present invention.

FIG. 2 is a top elevation view of the furnace shown in FIG. 1.

DESCRIPTION OF THE PREFERRED EMBODIMENTS

Referring particularly to the drawing, FIGS. 1 and 2 illustrate a dual chamber melting system of the recirculating type. The system includes a charging chamber 2 and a heating chamber 4 separated by a dividing wall 6.

The dividing wall 6 is provided with at least one lower passageway or opening 8 through which the chambers 2 and 4 are in communication at a bottom portion of the furnace below the surface 9 of molten metal 10. The dividing wall 6 is also provided with at least one upper passageway or opening 12 through which the chambers 2 and 4 are in communication above the level of molten metal 10. A furnace exhaust stack 14 extends from the end wall 16 of the heating chamber 4. As shown in FIG. 2, the melting system further includes a circulating line 18 provided with a pump 20 to continuously circulate molten metal 10 from the heating chamber 4 to the charging chamber 2 and back to the heating chamber 4. The pump 20 is preferably located near the exit end of the circulating line 18 to insure that the molten metal flowing out of the circulating line has sufficient force and velocity to sweep across substantially the entire width of the charging chamber 2. The preferred direction of molten metal flow is illustrated by the arrows in FIG. 2.

The charging chamber 2 is provided with a charge port 22 through which contaminated scrap metal is introduced into the molten metal in the furnace. The charge port 22 should be large enough to expedite the charging operation. A door 25 may be provided over the charge port 22, but it has been found that a wire mesh screen 24 may be used alone or in combination with the door 25. It has been found that the screen can be lifted more easily than the door 25 for charging. By positioning a screen over the charge port 22, large quantities of air cannot penetrate the screen and enter the charging chamber 2, and also large quantities of hydrocarbon emissions are prevented from escaping the charging chamber 2 and entering the work area which may otherwise cause pollution or respiratory problems. It has been found that a ¼ inch thick screen constructed of 0.063 inch wire and weighing 3.5 to 4.5 pounds per square foot has been adequate for this application. By positioning a door 25 over the charge port 22, an even tighter air seal between the charging chamber 2 and the ambient atmosphere outside the charge port 22 is provided.

The furnace floor 26 at the bottom of the charging chamber 2 is preferably sloped downwardly toward the dividing wall 6 in order to provide a surface above the molten bath level, also known as sill level, onto which a quantity of skim, or floating surface refuse, may be deposited. By depositing the skim on the inclined floor 26 above the molten bath level, metal entrapped therein will tend to drain downwardly and thereby be recovered in the molten bath. After the deposited skim has been given ample time to drain, it is pulled out of the charging bay 2 by a fork lift truck, or the like, adapted with a paddle or other pulling tool. The inclined floor 26 at the bottom of the charging chamber 2 also prevents quantities of scrap from accumulating near the charge port 22, and assists in transferring the scrap metal deposited in the charging chamber 2 toward the circulation current of molten metal 10.

Centrally directed burner ports 28 are provided through the upper portion of the charging chamber 2. These burner ports 28 may be controlled by butterfly valves, or the like, to selectively regulate the amount of combustion air which enters the chamber 2. Oxygen meters may be provided in the flue 14 in order to monitor and maintain a closed-loop control of the amount of combustion air required to burn the hydrocarbon vapors under varying operating conditions. Currents of combustion air entering the charging chamber 2 through ports 28 may assist in driving some of the hydrocarbon vapors into the heating chamber 4, but it is the pressure differential that is the primary driving force in moving the vapors to the heating chamber 4.

The wall 6 separating the heating chamber 4 from the charging chamber 2 is constructed of suitable refractory material able to withstand the combustion temperatures as well as the temperatures of the circulating molten bath of approximately 1350° to 1550° F. As indicated earlier, the chambers 2 and 4 are in communication above and below the level of molten metal 10. Preferably, the upper opening 12 is located as close to the furnace roof 32 as possible, and the lower opening 8 is located as close to the furnace floor 26 as possible. The openings 8 and 12 may be single passageways and may extend across the entire width of the furnace or they may consist of multiple passageways. In either event, the openings 8 and 12 should be sized large enough such that metal underflow and gaseous overflow from the charging chamber 2 to the heating chamber 4 is unencumbered while being sized small enough to maintain the pressure differential between the two chambers 2 and 4. The size of the lower opening 8 should be such that a metal underflow rate or velocity of from approximately 10 to 20 feet per minute may be maintained through the lower opening. The upper opening 12 should have a cross-sectional area greater than the smallest cross-sectional area through any section of the flue 14. The dividing wall 6 must penetrate the surface of the molten bath 10 to assure that unmelted floating scrap does not float into the heating chamber 4 where excessive oxidation may occur, and also to assure that the hot combustion products in the heating chamber 4 do not pass under the wall 6 into the charging chamber 2.

The heating chamber 4 may be of an area larger than that of the charging chamber 2 in the plane of the molten metal surface 9, and preferably, the area of the heating chamber 4 is approximately double the area of the charging chamber. Heating means such as centrally directed burners 30 are provided in the heating chamber 4 through the upper portion of the furnace. Roof burners or the like may also be used to provide such heat in the heating chamber 4. Through the burners 30, fuel, such as oil or natural gas, provides the heat necessary to maintain a molten bath temperature $T_1$ of, preferably, about 1400° to 1450° F in the directly fired heating chamber 4. Such temperature for the molten bath in the heating chamber 4 along with a circulation rate molten liquid to scrap solid ratio of approximately 20 to 1 pounds, assures that satisfactory melt rates will be maintained in the charging chamber 2 as the molten metal 10 circulates therethrough. The circulating molten bath 10 may loose approximately 50° to 100° F from the time the metal leaves the heating chamber 4 through the circulating line 18 until the time that metal re-enters the heating chamber 4 from the charging chamber 2 through opening 8 in wall 6. The molten bath temperature $T_2$ in the charging chamber 2 is preferably approximately 1300° to 1400° F.

A continuous overflow nozzle or port 24 may be provided at a desired location in the system of the present invention to substantially continuously remove molten metal from the system. Alternatively, a conventional tap hole may be provided to remove the metal from the system. The amount of molten metal removed from the system should be commensurate with the amount of scrap metal being charged into the system to maintain a relatively balanced system.

A door 44 may be provided in a sidewall 34 or 36 of the furnace to provide a means of access to the heating chamber 4 for cleaning, repairing and the like.

The furnace exhaust stack 14 extends from a wall of the heating chamber 4 at a location above the maximum level of molten metal 10. The stack 14 may extend from the roof 32 or sidewalls 34 and 36 of the furnace, but preferably the stack 14 extends from the end wall 16. This preferred arrangement locates the exhaust stack 14 as far as possible from the upper opening 12 in the dividing wall 6 to assure that the hydrocarbon vapors flowing therethrough have sufficient dwell time to be completely burned in the heating chamber 4. Also, the entrance of the exhaust stack 14 should preferably be located closely adjacent the maximum level 9 of molten metal 10 in order to create a negative pressure zone as low as possible in the heating chamber 4, with respect to the charging chamber 2. By creating such negative pressure zone, the hydrocarbon vapors entering the heating chamber 4 from the upper opening 12 in the wall 6 are drawn downwardly toward the lower regions above the molten surface 9 where the hydrocarbons are more completely burned.

The exhaust stack 14 may be of sufficient height and size to maintain the negative pressure zone by natural draft. Alternatively, an induced draft fan 38 perhaps employed with draft control instrumentation, may be provided to more accurately control the negative pressure differential in the heating chamber 4 with respect to the charging chamber 2.

According to the present invention the heating chamber 4 operates under a negative pressure with respect to the charging chamber 2. The negative pressure differential between the chambers need only be slight, on the order of approximately −0.01 to −0.05, and more preferably from −0.01 to −0.02 inch water column, to effectively draw the hydrocarbon vapors through the upper opening 12 provided in the wall 6 into the heating chamber 4, without adversely affecting the furnace operation.

In an alternative embodiment of the present invention, only the heating chamber 4 is slightly negative with respect to ambient air outside the furnace. In this embodiment the charging chamber 2 is maintained at a near normal or slightly positive pressure of from −0.005 to +0.02 inch water column, with respect to the ambient air outside the furnace. The heating chamber 4 is maintained at a negative pressure of from −0.01 to −0.05, and more preferably from −0.01 to −0.02 inch water column, with respect to the charging chamber 2. By this arrangement a minimal air seal will have to be maintained over the charging port 22 to prevent excess air from entering the furnace. Also, this pressure differential between the two chambers 2 and 4 will cause the hydrocarbon vapors emitted from the scrap charged into the charging chamber 2 to be effectively drawn through the upper opening 12 into the heating chamber 4.

In another embodiment of the present invention the charging chamber 2 is maintained at a slightly negative pressure of from −0.005 to −0.02 inch water column, with respect to the ambient air outside the furnace. The heating chamber 4 is maintained at a negative pressure of −0.01 to −0.05, and more preferably from −0.01 to −0.02 inch water column, with respect to the charging chamber 2. In this embodiment an effective air seal will have to be maintained over the charging port 22 to prevent excess air from entering the furnace. Such effective air seal will have to be nearly air tight, and most screens, alone, will not provide an effective air seal.

In the operation of the dual-chamber remelt furnace of the present invention a molten bath 10 at the bottom of the furnace is continuously circulated from the heating chamber 4 through a recirculating line 18, to the charging chamber 2 from which the molten bath 10 flows back into the heating chamber 4. Contaminated scrap, such as greasy or oily aluminum briquettes, is intermittantly or continuously charged into the charging chamber 2. Scrap charging may be accomplished by a fork lift truck, or the like, which can dump a pallet sized load of scrap briquettes through the charging port 22 after the door 25 has been opened and the screen 24 has been lifted out of the way of the pallet. Single briquette charging by conveyor mechanisms or the like may also be employed.

The contaminated scrap tends to float, i.e. is only partially submerged, on the molten metal bath 10 in the charging chamber 2. The scrap may be partially forcibly submerged, such as by introducing another pallet sized load of briquettes on top of the floating scrap. The temperature in the charging chamber 2, above the molten bath 10, of less than approximately 1300° F, is low enough to minimize oxidation. The majority of the scrap is melted in the charging chamber ablatively by the molten bath 10 primarily due to the circulating undercurrent of molten metal. Minimizing oxidation combined with ablative melting in accordance with the present invention has been found to reduce melt loss.

Concurrently with the heating and melting of the scrap charge, hydrocarbon vapors are emitted from the contaminated scrap in the charging chamber 2. Large quantities of hydrocarbon emissions evolved into the confined charging chamber 2 may temporarily cause the pressure in the chamber 2 to become slightly more positive than previously with respect to ambient air for a short period of time. A protective cover, such as the screen 24, and/or the door 25 is provided over the charging port 22 to deter these hydrocarbon vapors from escaping the furnace and thereby confine the vapors in the charging chamber 2 for the short time necessary to allow the excessive quantity of vapors to be drawn into the heating chamber 4.

As described above, a slightly negative pressure is maintained in the heating chamber 4, with respect to the charging chamber 2, such as by natural draft or by induced draft in the exhaust stack 14. A negative pressure differential always tends to balance or equalize itself by drawing upon higher pressure gas. With the upper opening 12 provided in the wall 6, the primary source for drawing gas is from the charging chamber 2 through this opening 12 provided in the dividing wall 6. When necessary, the charging chamber 2 may be forced to be more positive than the heating chamber 4 by introducing combustion air, either ambient or under positive pressure, through the burner ports 28 provided in the charging chamber 2. The introduction of combustion air into the charging chamber 2 not only introduces oxygen into the system, but also assists in establishing the pressure differential between the two chambers which acts as the primary driving force for moving the vapors from the charging chamber 2 to the heating chamber 4. By introducing combustion air into the furnance through the burner ports 28, an air current may be established as a secondary driving force to sweep the vapors in the charging chamber 2 into the heating chamber 4. Therefore, in the operation of the melting system of the present invention, the hydrocarbon vapors emitted from the charged scrap are drawn from the charging chamber 2 into the hot chamber 4 without the use of, or the need for, auxiliary gas tranfser equipment.

The burners 30 may be supplied with gas or oil which yield a flame temperature of approximately 3000° to 4000° F, thereby providing sufficient heat, approximately 1500° to 2500° F in the lower regions of the heating chamber 4 above the molten metal level 9, to burn the hydrocarbons in the vapors drawn into the heating chamber 4. Oxygen in the combustion air, which may also be drawn into the heating chamber 4, enters into a combustion reaction with the hydrocarbon vapors. If additional oxygen is required, raw oxygen may be purged into the heating chamber 4 through centrally directed oxygen ports 40 provided through the upper portion of the heating chamber 4. In the present invention, the amount of oxygen drawn into the heating chamber 4 is sufficient to promote the combustion of the hydrocarbons without causing excess oxidation and melt loss. Burning of the hydrocarbons drawn into the heating chamber 4 in accordance with preferred practices of the present invention actually supplies heat to the chamber 4 rather than resulting in any appreciable cooling thereof. By the method of the present invention not only are particulate stack emissions abated, but also the heat released by combustion of the hydrocarbons in the vapors is utilized within the furnace.

A typical exemplary operating sequence for a dual hearth furnace of the present invention is as follows. Approximately 100,000 pounds of molten metal is continuously circulating at a rate of approximately 300,000 pounds per hour from a heating chamber 4 into a circulating line 18 through a pump 20 into a charging chamber 2 and back into the heating chamber 4. A draft is induced through an exhaust stack 14 in the heating chamber 4 to create a negative pressure of from −0.01 to −0.03 inch water column in the heating chamber 4 with respect to the charging chamber 2, as measured at or near sill level in both chambers. The temperature in the heating chamber 4 is maintained at approximately 1450° F by supplying natural gas to the fuel burners 30 and setting these burners on high fire. About 600 pounds of salt flux, comprising about 4% of the total charge weight, is charged into the charging chamber 2 and allowed to disperse and melt therein. Oily scrap briquettes are then charged in approximately 3000 pound increments into the charging chamber 2. Each 3000-pound increment of charge causes a drop of approximately 30° F in circulating metal temperature in the furnace system as measured at the exit of the heating bay 4. Although temperature losses are experienced, the overall desirable temperature ranges discussed above should be maintained throughout the operating sequence.

When temperature recovery is noted which takes approximately five minutes after the initial charge, a second 3000 pound increment of scrap briquettes is charged into the charging chamber 2. The second charge of briquettes will submerge the unmelted floating residue from the previous charge increment. During the period required for noting slight temperature recovery, the majority of the oily vapors and other unburned hydrocarbons are released from the briquettes in the first charge increment. These vapors are continuously drawn from the charging chamber 2 into the heating chamber 4 by the negative pressure differential maintained in the heating chamber 4. Charging is continued incrementally in this manner until approximately 15,000 pounds of scrap has been charged. When temperature recovery is noted after the final charge increment, the remaining floating scrap briquettes may have to be submerged by auxiliary equipment. This "puddling" operation requires a stirring and dunking motion. Puddling also serves to mix the salt and the skim for optimization of metal recovery.

After all charged material is melted, the skim, or floating surface refuse, should be scraped off the surface of the molten metal in the charging chamber 2. Once the charging chamber 2 is cleaned of skim, salt should be recharged. Then, about 12,000 to 15,000 pounds of molten aluminum should be removed from the system such as by tapping into a transfer crucible. During tapping, the recently charged salt is melting and the lower region of the heating chamber 4 is heated to the required temperature by regulating the fuel burners on high fire. This operating sequence is repetitious.

Whereas the particular embodiments of this invention have been described above for purposes of illustration, it will be apparent to those skilled in the art that numerous variations of the details may be made without departing from the invention.

What is claimed is:

1. A process for burning hydrocarbons in vapors emitted from contaminated metallic scrap comprising the steps of:
    charging the scrap into a charging chamber of a furnace having a molten bath moving therethrough, said bath located substantially across the bottom portions of said charging chamber and a directly fired heating chamber, said chambers separated by a wall, said chambers in communication below the surface of the molten bath through at least one lower passageway through said wall, and said chambers in communication above the surface of the molten bath through at least one upper passageway through said wall;
    maintaining a negative pressure in the heating chamber with respect to the charging chamber, whereby hydrocarbon vapors emitted from the scrap charged into the charging chamber are drawn through the upper passageway through said wall and into the heating chamber by said pressure differential; and
    completing the combustion of the hydrocarbons in the vapors in the heating chamber.

2. A process as set forth in claim 1 wherein said negative pressure is created in the heating chamber by natural draft through a furnace stack in communication with the heating chamber above the level of molten metal.

3. A process as set forth in claim 1 wherein said negative pressure is created in the heating chamber by inducing a draft through a furnace stack in communication with the heating chamber above the level of molten metal.

4. A process for melting a light metal charge, surface contaminated with volatizable and combustible impurities comprising:
    introducing the charge through a charging port of a charging chamber of a dual chamber furnace having a molten bath moving therethrough, said bath substantially continuously circulating from a directly fired heating chamber to the charging chamber and back to the heating chamber, said chambers separated by a wall and in communication below the surface of the molten bath through at least one lower passageway through said wall, and in communication above the surface of the molten bath through at least one upper passageway through said wall;

placing a cover over the charging port of the charging chamber;

maintaining a negative pressure of −0.01 to −0.05 inch water column in the heating chamber with respect to the charging chamber, whereby hydrocarbon vapors emitted from the charge are drawn through the upper passageway and into the heating chamber; and combusting the hydrocarbon vapors in the heating chamber, whereby combustion heat is provided to the heating chamber and the molten metal circulating therethrough.

5. A process for melting aluminum charge, surface contaminated with volatizable and combustible impurities comprising:

introducing salt flux comprising approximately 2 to 6 percent of total charge weight through a charge port of a charging chamber in a dual chamber furnace having a molten aluminum bath moving therethrough in an amount equal to approximately 15 to 20 times the total charge weight, substantially continuously circulating said bath from a directly fired heating chamber through a recirculating line into the charging chamber and back to the heating chamber, said chambers separated by a wall and in communication below the surface of molten aluminum through at least one lower passageway through said wall, and in communication above the surface of molten aluminum through at least one upper passageway through said wall;

dispersing and melting the salt flux in the bath circulating through the charging chamber;

introducing the contaminated aluminum charge onto the surface of the bath in the charging chamber through the charge port;

covering the charge port;

maintaining a negative pressure of from −0.01 to −0.02 inch water column in the heating chamber with respect to the charging chamber by inducing a draft through an exhaust stack provided in the heating chamber whereby hydrocarbon vapors emitted from the charge are drawn through the upper passageway and into the heating chamber;

combusting the hydrocarbon vapors in the heating chamber maintained at a temperature of approximately 1500° to 2500° F in the lower regions of the heating chamber above the molten bath level, whereby additional combustion heat is provided to the heating chamber and the molten bath circulating therethrough;

removing the majority of the skim from the surface of the molten bath in the charging chamber; and removing molten aluminum from the system in an amount substantially commensurate with the total charge weight.

6. A process as set forth in claim 5 wherein the aluminum charge is introduced incrementally and the charge port is covered after each incremental charge, with each incremental charge delayed for a time sufficient for the molten bath in the charging chamber to begin temperature recovery, whereby each successive incremental charge submerges unmelted, floating residue from the previous incremental charge.

7. A process as set forth in claim 5 further comprising:

maintaining a negative pressure of from −0.005 to −0.001 inch water column in the charging chamber with respect to ambient atmosphere outside the furnace.

8. A process as set forth in claim 5 in which said lower passageway is large enough to permit a metal underflow rate of from 10 feet per minute to 20 feet per minute through said lower passageway.

9. A process as set forth in claim 5 in which the cross-sectional area of said upper passageway is equal to or greater than the smallest cross-sectional area through any section of said exhaust stack.

10. A process for burning hydrocarbons in vapors emitted from contaminated metallic scrap comprising the steps of:

charging the scrap into a charging chamber of a dual chamber furnace having a molten metal bath therein, the charging chamber separated from a heating chamber by a wall, said chambers in communication below the surface of a molten metal bath circulating therebetween through at least one lower passageway through the wall, and said chambers in communication above the surface of the molten metal bath through at least one upper passageway through the wall;

maintaining a negative pressure in the heating chamber with respect to the charging chamber, whereby hydrocarbon vapors emitted from the scrap charged into the charging chamber are drawn through the connecting member into the heating chamber; and completing the combustion of hydrocarbons in the vapors in the heating chamber.

11. A process as set forth in claim 10, wherein said pressure differential is maintained by providing a furnace stack in communication with said heating chamber above the surface of molten metal sufficiently sized to create a natural draft necessary to draw said vapors from the charging chamber into the heating chamber.

12. A process as set forth in claim 10, wherein said pressure differential is maintained by providing an induced draft fan disposed inside a vent which is in communication with said heating chamber above the surface of molten metal.

* * * * *